United States Patent [19]

Hay, II et al.

[11] 4,098,635

[45] Jul. 4, 1978

[54] APPARATUS FOR INSULATION OF STRUCTURES

[75] Inventors: Robert A. Hay, II, Midland; Edward V. Dettmer, Bay City, both of Mich.

[73] Assignee: The Dow Chemical Company, Midland, Mich.

[21] Appl. No.: 496,422

[22] Filed: Aug. 12, 1974

Related U.S. Application Data

[63] Continuation of Ser. No. 302,837, Nov. 1, 1972, abandoned.

[51] Int. Cl.² .................... B29H 7/00; E04B 1/32; B29J 1/00
[52] U.S. Cl. ........................ 156/445; 52/80; 156/475; 156/500; 425/60; 425/63

[58] Field of Search ............... 52/80; 425/60, 63, 508, 425/375; 33/21 B; 264/32, 248; 156/71, 169, 170, 172, 180, 186, 195, 213, 244, 304, 445, 475, 500, 544, 574, 576, 577

[56] References Cited

U.S. PATENT DOCUMENTS

| | | | |
|---|---|---|---|
| 3,337,384 | 8/1967 | Wright | 156/180 |
| 3,423,791 | 1/1969 | Smith, Jr. et al. | 52/80 |
| 3,443,276 | 5/1969 | Smith et al. | 264/32 |
| 3,458,609 | 7/1969 | Smith et al. | 52/309 |
| 3,590,448 | 7/1971 | Bryant | 52/80 |
| 3,616,070 | 10/1971 | Lemelson | 156/244 |
| 3,726,736 | 4/1973 | Wolfenden | 156/244 |

*Primary Examiner*—Douglas J. Drummond

[57] ABSTRACT

An apparatus is described which is particularly suitable for applying insulation in the form of plastic foam or the like to a surface of a container to be insulated. The apparatus deposits a strip of foam in a generally helical manner while following the contour of the container or structure.

7 Claims, 6 Drawing Figures

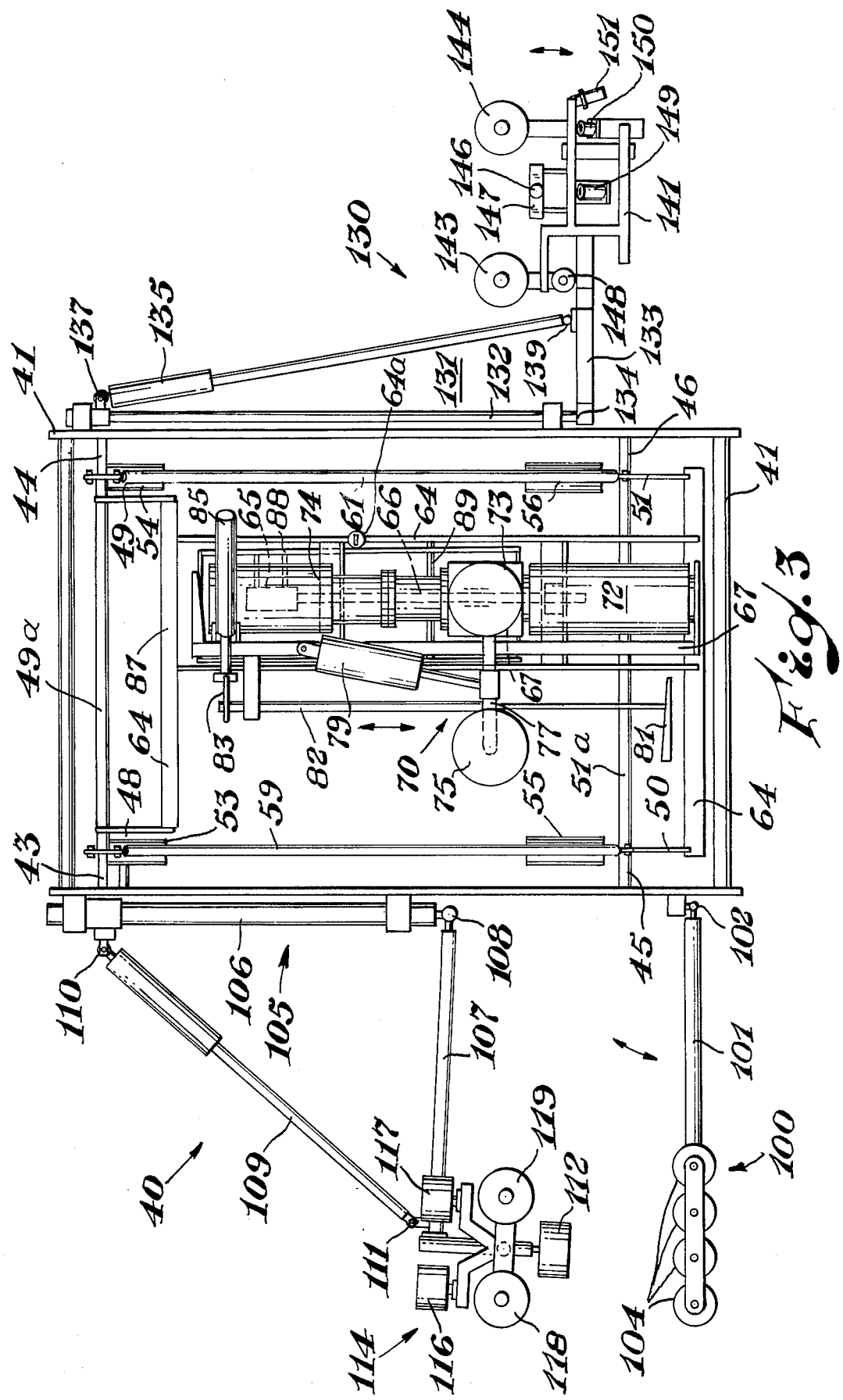

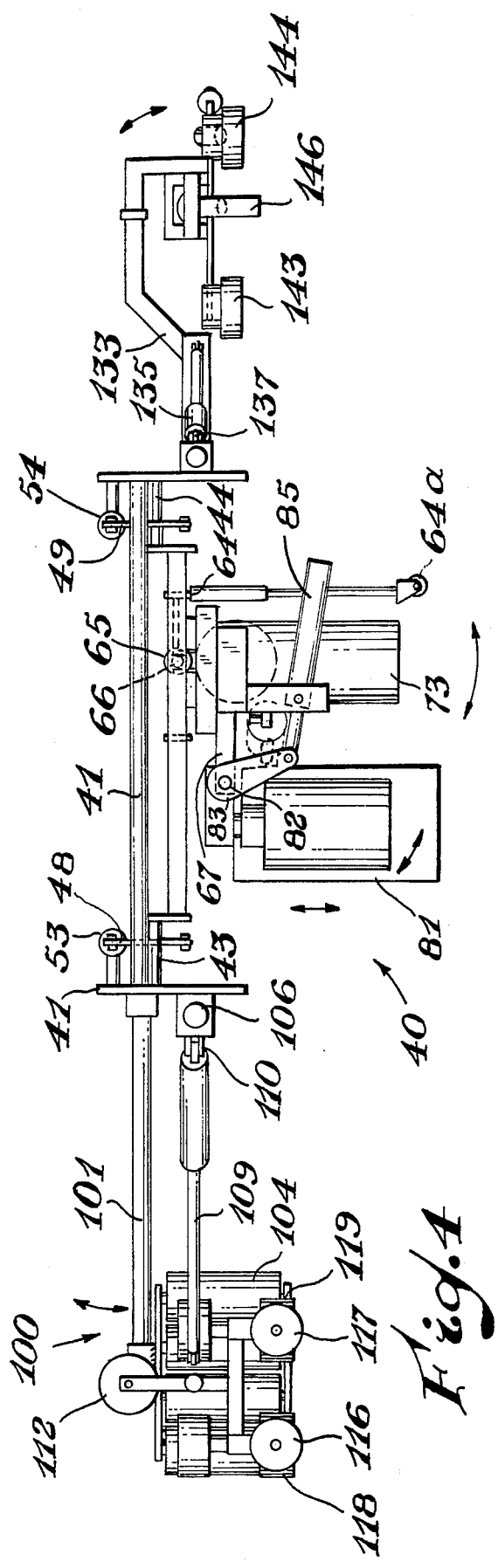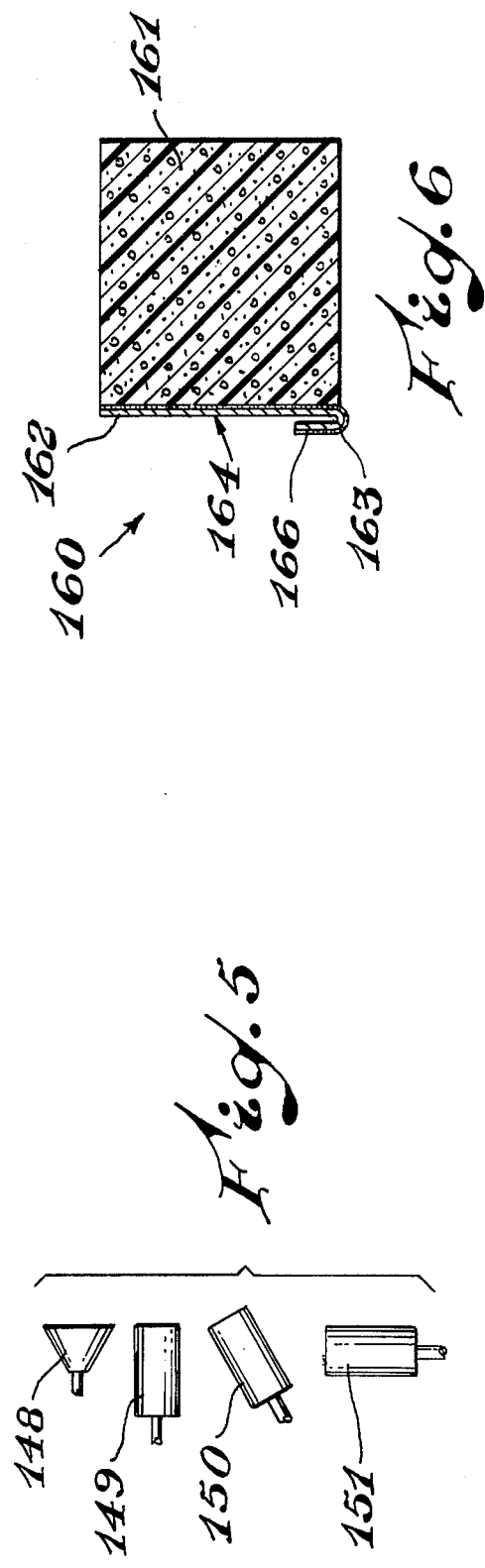

APPARATUS FOR INSULATION OF STRUCTURES

CROSS REFERENCE TO RELATED APPLICATION

This is a continuation of application Ser. No. 302,837, filed Nov. 1, 1972, now abandoned.

Vessels for the transportation or containment of cryogenic liquids must be thermally insulated. It is known that such thermal insulation may be applied by depositing a plurality of strips or loops of insulating material about the exterior of such a container. Substantial difficulties exist in the deposition of insulating material about such containers particularly when this must be accomplished in a confined space such as in the hull of a ship. Oftentimes such containers or vessels are of a substantial size and although designed to be of a given dimension and geometry, dimensional tolerances often exist in the container which must be accommodated by any apparatus which applies insulation thereto. For example, if one assumes a spherical tank is being insulated, an arcuate pivotable track or boom can be provided which supports a foam depositing head and rotates about the container applying successive loops or turns of insulation in a generally helical manner. It is not uncommon in such tanks to find variations from the design dimension of several centimeters and instead of having the expected spherical surface one has a generally spherical surface having irregularities. In order to apply insulating material to such a surface in a satisfactory manner, the insulation should conform to or be generally uniformly spaced from the actual supporting surface rather than the designed surface. Strips of insulation applied are not always of constant dimension and minor deviations occur which oftentimes are cyclical in nature and if randomly distributed about the periphery of the container offer little difficulty. However, such variations at times can give rise to undesirable variations in insulation height about the container being insulated.

It would be desirable if there were available an improved apparatus for the insulation of vessels.

It would also be desirable if there was an improved apparatus for the insulation of cryogenic vessels employing synthetic resinous cellular insulation.

It would further be desirable if there were an improved apparatus available for the insulation of vessels which would apply the insulation in a generally uniform manner.

These benefits and other advantages in accordance with the invention are achieved in an apparatus for the deposition of thermal insulation in a predetermined pattern, the apparatus comprising a foam depositing means including a foam depositing head which deposits a strip of foam insulation, the foam depositing means adapted to be moveably supported on a moveable support means which travels in a predetermined path and maintains the foam depositing means a generally fixed distance from a desired surface of deposition, the foam depositing head comprising in cooperative combination a first head positioning means which positions a foam depositing head in a direction generally normal to the surface of deposition, a second head positioning means to selectively position the head in angular relationship to the surface being insulated in a direction generally normal to the direction of foam deposition, a third head positioning means which resiliently positions the head in a direction generally parallel to a major surface of the insulation and normal to the direction of deposition.

Various foam depositing means are known in the art, particularly for the preparation of walled structures, and are described in U.S. Pat. Nos. 3,206,899; 3,336,631; 3,336,632; 3,337,384; 3,423,791; 3,443,276 and 3,619,329, herewith incorporated by reference thereto. Foam depositing heads are also known for depositing foam against an adjacent supporting surface as well as a previously deposited foam strip and such a head is described in U.S. Pat. No. 3,458,609, herewith incorporated by reference thereto. Generally foam depositing heads which deposit foam upon a single surface are readily modified for the deposition of foam into an angular recess such as is formed between the surface of a vessel to be insulated and a previously deposited insulation strip by removing one set of side rolls or guide plates, whichever are employed. Various insulating foams suitable for use with the apparatus of the present invention are described in the hereinbefore delineated patents which are herewith incorporated by reference thereto.

Further features and advantages of the present invention will become more apparent from the following specification taken in connection with the drawing wherein:

FIG. 1 schematically depicts an apparatus in accordance with the present invention in operation.

FIGS. 3 and 4 are two views of one embodiment of the foam depositing apparatus of the present invention.

FIG. 5 schematically depicts the angular disposition of foaming rolls of the apparatus of FIGS. 3 and 4.

FIG. 6 schematically depicts a sectional view of one variety of insulating element useful in the present invention.

Figure 1:
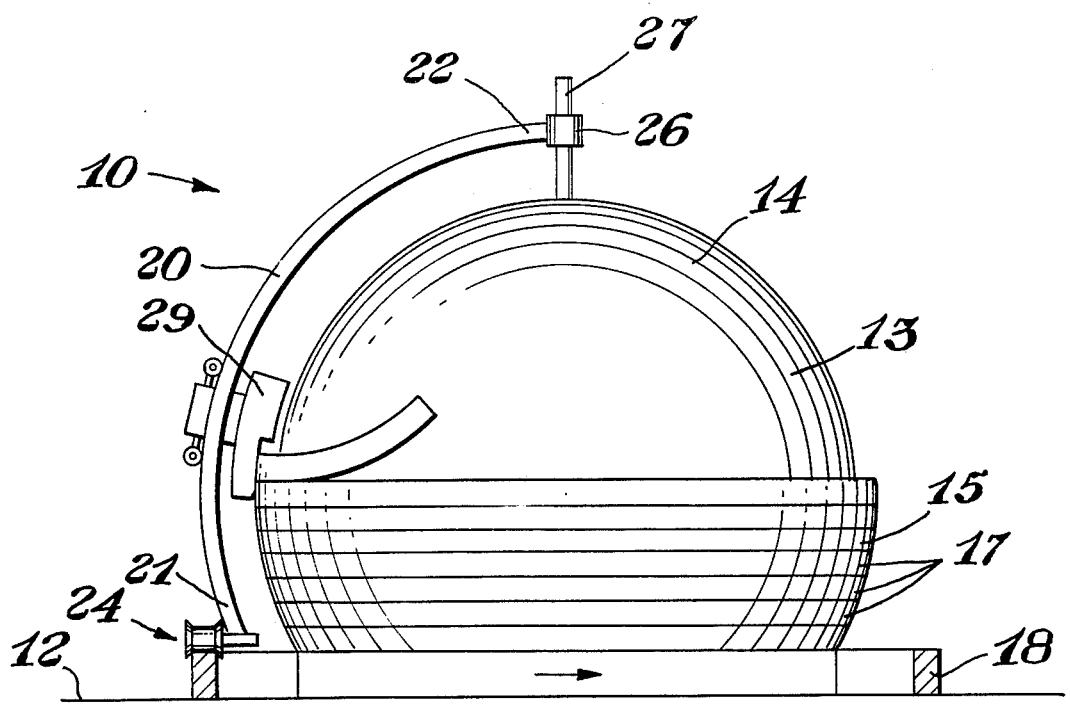

In FIG. 1 there is schematically illustrated an assembly of the invention generally designated by the reference numeral 10. The assembly 10 comprises in cooperative combination a support or deck 12 which supports a generally spherical container 13. The container or body 13 has a generally spherical exterior surface 14. About a portion of the surface 14 is disposed an insulating layer 15. The insulating layer 15 comprises a plurality of loops or turns 17 of thermal insulation applied in a generally helical spiral manner. A guide or supporting means 18 having a generally annular configuration is carried on the support or deck 12 and is coaxially arranged with respect to an axis of generation of the container 13. A moveable support or boom 20 is disposed adjacent the tank 13. The support 20 has a generally arcuate configuration and has a first or lower end 21 and an upper end 22. The lower end 21 has affixed thereto a propulsion assembly 24 which engages the guide or support 18 and moves the lower end 21 of the support or boom 20 about the container 13 in the direction indicated by the arrow. The second end 22 of the boom 20 has affixed thereto a bearing sleeve 26 which in turn rotatably engages a shaft or support 27. A foam depositing assembly 29 is moveably supported on the boom 20 and is selectively positioned at locations on the boom lying between the first and second ends 21 and 22.

In operation of the assembly as depicted in FIG. 1, a suitable starter strip optionally is applied to the container 13 at a location adjacent the support 12. Beneficially the starter strip extends one turn about the container and at its terminal end has the thickness of the desired insulation which is to be applied. The foam depositing head 29 is then positioned adjacent the termination of the starter strip and the boom 20 rotated about the guide 18 and the shaft 27 and insulation deposited as a plurality of turns or loops until a desired portion of the surface 14 has been enclosed within an insulating shell. Any remaining portion of the surface such as the spherical segment of one base generally adjacent the shaft or support 27 can subsequently be covered with insulation by other methods well known to the art. Alternately, insulation may be applied by affixing a suitable starter strip adjacent the shaft 27 and winding the insulation downwardly.

Figure 2:
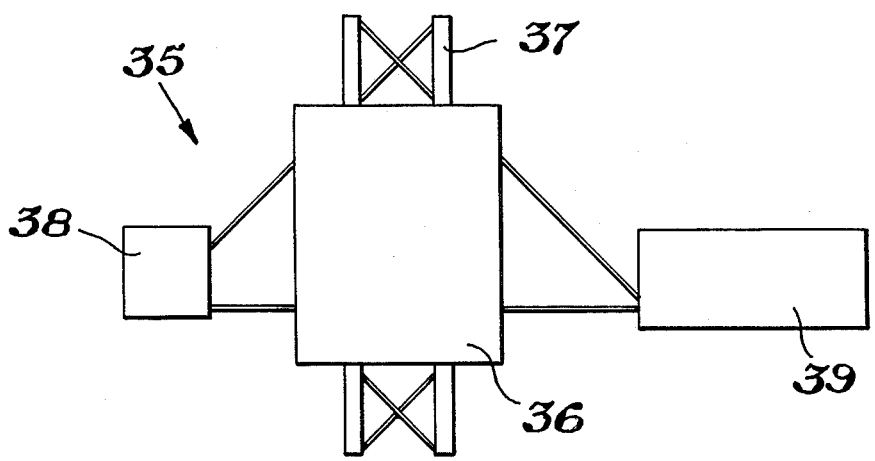
FIG. 2 is a schematic representation of a foam depositing assembly in accordance with the present invention.

FIG. 2 is a schematic representation of the principle components of a foam depositing head in accordance with the invention generally designated by the reference numeral 35. The head 35 comprises a main body portion 36 which is supported by and is moved on a boom assembly 37 by a drive means, not shown. The main body portion 36 carries appropriate means to deposit a strip of insulating material and join it to a previously deposited strip. Affixed to the body portion 36 is a guide means 38 used when employing preformed insulating strips. The guide means 38 serves to position the preformed strip and assure that it has the proper approach angle when entering the main body portion 36. Remote from the guide means 38 and adjacent the body 36 is a surface finishing or treating means 39 which beneficially is employed to apply a coating or otherwise treat the external surface of the deposited strips such as by heat sealing an external laminate to a previously deposited strip. Such an apparatus is schematically depicted in greater detail in FIGS. 3 and 4.

In FIG. 3 there is depicted a more detailed schematic representation of insulation applying apparatus generally designated by the reference numeral 40. As depicted in FIG. 3, the apparatus is viewed from its operating face; that is, the side disposed adjacent the container or body to be insulated, and FIG. 4 is a top view of the apparatus of FIG. 3 assuming that the apparatus of FIG. 3 is oriented in the same manner as the depositing head of FIG. 1. The apparatus 40 comprises in cooperative combination a first frame 41. The first frame 41 has a generally hollow rectangular configuration and is shown in part. For clarity of illustration, the portion of the frame which engages a boom or other support such as the boom 20 of FIG. 1 and its associated drives to move the frame on the support have been omitted. The frame 41 is of generally planar hollow rectangular configuration and has disposed therein a first head positioning means comprising a first pivot pair 43 and 44 and a second pivot pair 45 and 46. Each of the pivots 43, 44, 45 and 46 has affixed thereto bell cranks 48, 49, 50 and 51, respectively. The bell cranks 48 and 49 are rigidly joined by a shaft 49a and cranks 50 and 51 similarly joined with a shaft 51a. The bell cranks 48, 49, 50 and 51 in turn are actuated by linear actuators or positioners 53, 54, 55 and 56, respectively, such as pneumatic or hydraulic cylinders. Remote from the arms of the bell cranks engaging the linear positioners 53 and 55 is pivotally affixed a connecting rod 59. A similar connecting rod 61 joins the bell cranks 49 and 51. Conveniently the bell cranks are of a T-shaped configuration and pivoted to the first frame at the juncture of the two arms. The connecting rods 59 and 61 and the linear actuators are connected to opposite ends of the crossed arm. The remaining arms of the bell cranks 48, 49, 50 and 51 are pivotally affixed to a second fram 64. The second frame 64 has affixed thereto a demountable second frame spacing means or caster 64a. A second head positioning means comprises a third frame 88 adjustably mounted on the second frame 64 by means of a third frame pivot shaft 89 enabling the third frame to be selectively positioned angularly relative to the second frame 64. The shaft 89 is generally parallel to the shafts 49a and 51a. The third frame 88 has affixed thereto a third head positioning means comprising a linear actuator 65 such as a pneumatic cylinder. The actuator 65 has a moveable shaft 66 slidably supported in the third frame 88. A fourth frame 67 is adjustably, pivotally affixed to the shaft 66 by suitable means such as trunions on the frame and set collars to prevent axial movement of the fourth frame 67 relative to the shaft 66, thereby providing a fourth head positioning means. For clarity of illustration, locking means for setting the relative positions of second and third frames and third and fourth frames are not shown. Conveniently such locking means employ a bolt passing through two frames, one frame having a bolt hole of appropriate size and a slot in the remaining frame. Tightening of the bolt locks the frames into a desired position relative to each other. Motion of the fourth frame is indicated by the curved double headed arrow in FIG. 4 which is generally horizontally disposed. Motion of the second frame relative to the first frame is generally indicated by the centrally disposed double headed arrow of FIG. 4 and motion of the fourth frame relative to the third frame is shown by the vertically disposed double headed arrow generally centrally disposed in FIG. 3. The fourth frame relative to the first frame is capable of motion generally normal to the plane of the first frame, motion in the vertical direction as illustrated, pivotal motion about the shaft 66 to a limited degree and pivotal motion about the shaft 89. Supported on the frame 67 is a foam strip engaging and sealing assembly generally designated by the reference numeral 70. The assembly 70 comprises a first or external foam strip engaging or locating roll 72 having an axis of rotation generally parallel to the shaft 66 and a second foam engaging roll or seal pressure roll 73 disposed generally normal to the roll 72 and positioned remotely from the shaft 66. The rolls 72 and 73 are driven by means of a drive train 74. The rolls 72 and 73 are arranged to engage two adjacent sides of a rectangular foam strip. A pressure roll 75 is pivotally affixed to the frame 67. The roll 75 has an axis of rotation generally parallel to that of the roll 73 and is carried by pivot arms 77. The arms 77 are connected to a linear actuator 79 permitting the roll 75 to be selectively positioned toward or away from the roll 72. A generally planar heating assembly 81 is generally centrally pivotally supported by a shaft 82 from the fourth frame 67. The shaft 82 has affixed thereto an arm 83 which in turn is connected to a linear positioning means 85 such as a hydraulic cylinder. The positioner 85 is affixed to the fourth frame 67. Extension of the positioner 85 causes rotation of the shaft 82 and positioning of the heating means 81 adjacent to or remote from the roll 72. A foam strip receiving channel is formed by the heating means 81, the roll 72 and on the remaining side by the rolls 73 and 75. A guide means 100 is affixed to the frame 41 generally adjacent the heating means 81 and remote from the roll 72. The guide means 100 comprises a first arm 101 pivotally affixed to the frame 41 by a pivot 102. Remote from the pivot 102 and the arm 101 are a plurality of guide rolls 104 having an axis of rotation generally parallel to the axis of the rolls 73 and 75. The rolls 104 engage a foam strip to be deposited and a previously deposited foam strip to maintain an angle between the strips corresponding to the taper of the platen 81. A support and positioning assembly 105 is affixed to the frame 41 and positioned generally adjacent the arm 101. The support and positioning assembly comprises a generally triangular frame having a first arm 106 pivotally affixed to the frame 41 and extending in a direction generally parallel to the shaft 66 and pivoting about an axis generally common to one axis of the double pivot 102. The arm 106 is affixed to one end thereof. A second arm 107 is pivotally affixed to an end of the arm 106 generally adjacent the arm 101 by means of a pivot 108 which permits motion of the arm 107 relative to the arm 106 generally in the plane of the illustration. A third arm 109 is pivotally affixed to the arm 106 by means of a pivot 110 at a location remote from the pivot 108. The arm 109 is also affixed to the arm 107 by means of a pivot 111 at a location remote from the pivot 108. The arm 109 beneficially is a linear actuator such as a pneumatic or hydraulic cylinder assembly and can be selectively shortened and lengthened. A guide roll assembly 114 is affixed to the arm 107 at a location adjacent the pivot 111 and remote from the pivot 108. The guide roll assembly comprises a first container wall engaging roll 116 and a second wall engaging roll 117. The rolls 116 and 117 have axes of rotation generally parallel to the roll 72 and the shaft 66. A pair of foam engaging rolls 118 and 119 are disposed generally adjacent the rolls 116 and 117 and have axes of rotation generally normal to the axes of the rolls 116 and 117 and generally parallel to the rolls 73 and 75. Adjacent the rolls 118 and 119 is pivotally supported a foam engaging roll 112 having an axis of rotation generally parallel to the rolls 72, 116 and 117. The combination of the rolls 104, 118, 119 and 112 effectively forms a three-sided channel to guide a preformed generally rectangular foam strip toward the heating means 81 and the rolls 72, 73 and 75. A surface treating or finishing means 130 is affixed to the frame 41 remote from the guide means 105. The treating means 130 is supported upon a triangular frame 131. The triangular frame 131 comprises a first arm 132 pivotally affixed to the frame 41, a second arm 133 pivotally affixed to the first arm by a pivot 134 and a third variable length arm 135 pivotally affixed to the arm 132 remote from the pivot 134 by means of a pivot 137. The arms 135 and 133 are pivotally connected by the pivot 139. Beneficially, the arm 135 is of variable length such as a pneumatic or hydraulic cylinder. Affixed to the arm 133 remote from the pivot 134 and adjacent the pivot 139 is a frame 141. The frame 141 has rotatably disposed thereon first and second foam insulation engaging rolls 143 and 144. A guide roll 146 is mounted on a sliding support 147 carried by the frame 141. The guide roll 146 has an axis of rotation generally parallel to the insulation engaging rolls 143 and 144 which in turn have axes generally parallel to the axes 73 and 75. Four unfolding rolls 148, 149, 150 and 151 are rotatably disposed on the frame 141 and are generally positioned away from the frame 141 in the sequence given. A side view of each of the rolls 148, 149, 150 and 151 is shown in FIG. 5 to depict the relative angles between their axes. The function of the rolls 148, 149, 150 and 151 is to unfold a 180° fold in a metal skin on a foam strip supplied to the apparatus 40.

In operation of the apparatus 40, a generally rectangular thermoplastic foam strip is positioned in the channel formed by the rolls 118, 119, 112 and 104. The foam strip is then passed between the roll 75 and the heating means 81. The foam strip is then brought into engagement with the rolls 72 and 73 and forced toward a previously deposited strip. The actuator 65 beneficially maintains a predetermined pressure on the third frame 67 thereby forcing the roll 73 toward the previously deposited foam strip. Incremental motion of the first frame 41 can occur without varying the pressure applied by the roll 75. The surface of the previously deposited strip and the surface of the strip being deposited are heated by the heating means 81 to a temperature above their thermoplastic temperature and the strip being deposited is effectively heat sealed or fusion welded to the previous strip. In the event that a metallic skin has been placed on the surface of the foam strip generally in the manner as depicted in FIG. 6, the skin is unfolded by the rolls 148, 149, 150 and 151 to overlap the skin of a previously deposited foam strip. The variable length arms 109 and 135 permit adjustment of the guide means 100 and the treating unit 130 if required by minor deviations in the surface being covered. Motion of the second frame 64 relative to the first frame 41 maintains the assembly supported on the third and fourth frames a more or less fixed distance from the surface of the vessel being insulated. Rotation of the fourth frame about the shaft 66 permits the sealing platen 81 to be maintained in desired spaced relationship from the surface of the vessel being insulated in the event major undulations or variations are present in the surface being insulated. When employed with vessels with only minor surface variations, the fourth frame 67 is locked to the shaft 66 to prevent rotation. Further, the longitudinal motion of the fourth frame 67 by the linear actuator 65 along the axis of the shaft 66 permits the assembly to follow minor variations in foam thickness. If it is desired to remove the platen from a foam strip being deposited, the roll 75 is moved away from the platen 81 by the actuator 79 and the platen 81 pivoted by extension of the actuator 85.

In FIG. 6 there is schematically represented a cross-sectional view of an insulating element 160 useful with the apparatus of FIGS. 3 and 4. A generally rectangular insulating strip 161 has disposed on one side thereof a metallic foil 162. The metallic foil 162 has adhered to the surface thereof a hot melt adhesive 163. Typically, the metallic foil is aluminum and the hot melt adhesive is a copolymer of ethylene and acrylic acid. The foil and the hot melt adhesive form a laminate 164. The laminate 164 is wider than the foam body 161 and a portion of the laminate is folded back on itself to form a lip or flap 166. Conveniently, by heating the laminate 164 the adhesive layer 163 is caused to adhere to the foam body and secure the foam body in place. As an insulating strip such as the strip 160 is passed through the treating portion 130 of the apparatus 40 of FIGS. 3 and 4, the lip or flange 166 is unfolded and flattened against a like foil of the previously deposited strip and by the application of heat a generally vapor impervious seal is generated between the foils of adjacent turns.

Employing apparatus in accordance with the present invention, insulation is readily installed as a flat spiral configuration or a helical configuration on a cylindrical surface as well as on generally spherical enclosures. Other foam deposition heads are readily employed to deposit foam-in-place materials such as polyurethane foam compositions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an apparatus for the deposition of thermal insulation to a body, the apparatus comprising
    a foam depositing head, the foam depositing head adapted to be moveably supported on a moveable support means, the foam depositing means being selectively positionable at a location on the moveable support means, the moveable support means travels in a predetermined path and maintains the foam depositing head a generally fixed distance from the surface of a body to be insulated, the foam depositing head comprising in cooperative combination,
    a first frame adapted to be moveably supported on a support means, the first frame having supported thereon
    a second frame, the second frame being connected to the first frame by
    a second frame positioning means to position the first and second frames relative to one another, the positioning being done in generally parallel planes, the second frame supporting
    a third frame, the third frame being adjustably mounted on the second frame to permit positioning of the third frame in a non-parallel planar relationship to the second frame,
    a fourth frame slidably mounted on the third frame and
    means to selectively position the fourth frame on the third frame, the fourth frame having disposed thereon
    means to deposit thermal insulation.

2. The apparatus of claim 1 including an adjustable spacing means affixed to the second frame and terminating remote from the second frame in a pivotally mounted surface engaging roll.

3. The apparatus of claim 1 including a guide means disposed generally adjacent the first frame, the guide means comprising a plurality of rolls to engage a preformed insulation strip.

4. The apparatus of claim 1 having a surface treating means disposed adjacent the first frame.

5. In an apparatus for the deposition of thermal insulation to a body, the apparatus comprising
    a foam depositing head, the foam depositing head adapted to be moveably supported on a moveable support means, the foam depositing means being selectively positionable at a location on the moveable support means, the moveable support means travels in a predetermined path and maintains the foam depositing head a generally fixed distance from the surface of a body to be insulated, the foam depositing head comprising in cooperative combination
    a first frame adapted to be moveably supported on a support means, the first frame having supported thereon
    a second frame, the second frame being connected to the first frame by
    a second frame positioning means to position the first and second frames relative to one another, the positioning being done in generally parallel planes, the second frame supporting
    a third frame, the third frame being adjustably mounted on the second frame to permit positioning of the third frame in a non-parallel planar relationship to the second frame,
    a fourth frame slidably mounted on the third frame,
    means to selectively position the fourth frame on the third frame, the fourth frame having disposed thereon
    a pivot means in combination with the third and fourth frames to permit relative rotation of the third and fourth frames, the pivotal motion being generally in a plane parallel to the motion of the first and second frames and normal to the sliding motion of the third relative to the fourth frame and
    means to deposit thermal insulation including a foam strip engaging and sealing means.

6. The apparatus of claim 5 wherein the third and fourth frames are resiliently tensioned along the axis of sliding motion.

7. The apparatus of claim 6 wherein means to resiliently tension the third and fourth frames is a pneumatic cylinder.

* * * * *

UNITED STATES PATENT AND TRADEMARK OFFICE
CERTIFICATE OF CORRECTION

PATENT NO. : 4,098,635
DATED : July 4, 1978
INVENTOR(S) : Robert A. Hay, II; Edward V. Dettmer It is certified that error appears in the above-identified patent and that said Letters Patent are hereby corrected as shown below:

Column 3, line 68, delete "pivotally affixed to a second fram" and insert --pivotally affixed to a second frame--.

Column 8, line 39, delete "motion of the third relative" and insert --motion of the third frame relative--.

*Signed and Sealed this*

*Twenty-seventh* Day of *February 1979*

[SEAL]

Attest:

RUTH C. MASON
*Attesting Officer*

DONALD W. BANNER
*Commissioner of Patents and Trademarks*